US007031710B2

(12) United States Patent
Pedraza et al.

(10) Patent No.: US 7,031,710 B2
(45) Date of Patent: Apr. 18, 2006

(54) METHOD AND SYSTEM FOR LOAD SHARING BETWEEN A PLURALITY OF CELLS IN A RADIO NETWORK SYSTEM

(75) Inventors: Salvador Pedraza, Malaga (ES); Matias Toril, Malaga (ES)

(73) Assignee: Nokia Corporation, Espoo (FI)

( * ) Notice: Subject to any disclaimer, the term of this patent is extended or adjusted under 35 U.S.C. 154(b) by 116 days.

(21) Appl. No.: 10/481,484

(22) PCT Filed: Jun. 19, 2001

(86) PCT No.: PCT/EP01/06925

§ 371 (c)(1),
(2), (4) Date: Dec. 17, 2003

(87) PCT Pub. No.: WO02/104058

PCT Pub. Date: Dec. 27, 2002

(65) Prior Publication Data

US 2004/0180659 A1    Sep. 16, 2004

(51) Int. Cl.
*H04Q 7/20* (2006.01)
(52) U.S. Cl. .................. 455/436; 455/437; 455/443; 455/453
(58) Field of Classification Search ............ 455/422, 455/436, 437, 438, 439, 442, 443, 453
See application file for complete search history.

(56) References Cited

U.S. PATENT DOCUMENTS

| 5,241,685 | A |   | 8/1993  | Bodin et al.              |
|-----------|---|---|---------|---------------------------|
| 5,379,446 | A | * | 1/1995  | Murase ............ 455/444 |
| 5,491,837 | A | * | 2/1996  | Haartsen ........... 455/62 |
| 5,640,677 | A | * | 6/1997  | Karlsson .......... 455/434 |
| 5,774,809 | A | * | 6/1998  | Tuutijarvi et al. ..... 455/437 |
| 6,044,249 | A | * | 3/2000  | Chandra et al. ....... 455/62 |
| 6,091,955 | A | * | 7/2000  | Aalto et al. ......... 455/447 |
| 6,192,245 | B1 | * | 2/2001 | Jones et al. ......... 455/437 |
| 6,285,875 | B1 | * | 9/2001 | Alajoki et al. ........ 455/423 |
| 6,473,614 | B1 | * | 10/2002 | Quensel et al. ...... 455/436 |

FOREIGN PATENT DOCUMENTS

| WO | WO 93/12623 A1 | 6/1993 |
| WO | WO 98/21908 A1 | 5/1998 |
| WO | WO 00/38463 A2 | 6/2000 |

OTHER PUBLICATIONS

Chandra, et al., "Determination of Optical Handover Boundaries in a Cellular Network Based on Traffic Distribution Analysis of Mobile Measurement Reports," Vehicular Technology Conference, IEEE 47th Phoenix, AZ, USA, May 4, 1997, pp. 305-309, New York, NY, USA.

Mende, "Evaluation of a Proposed Handover Algorithm For the GSM Cellular System," Vehicular Technology Conference 29, 1990, pp. 245-252.

\* cited by examiner

*Primary Examiner*—William Trost
*Assistant Examiner*—James D Ewart
(74) *Attorney, Agent, or Firm*—Lackenbach Siegel, LLP

(57) ABSTRACT

The present invention relates to a method and a system for load sharing between a plurality of cells in a radio network system, wherein each of said cells is serving a number of mobile devices. For handover of a mobile device from a currently serving source cell to a target cell, a priorization among cells adjacent to the source cell is carried out by calculating the power budgets between the currently serving source cell on the one hand and said adjacent cells on the other hand, and the adjacent cell having the highest priority is selected as target cell.

14 Claims, 5 Drawing Sheets

```
Downlink quality/level distribution:

Class                                                                    Share
upper    DL      DL      DL      DL      DL      DL      DL      DL       in
range    q0      q1      q2      q3      q4      q5      q6      q7     range
(dBm)    (%)     (%)     (%)     (%)     (%)     (%)     (%)     (%)     (%)
-------  ------  ------  ------  ------  ------  ------  ------  ------  ------
-100     0.07    0.03    0.02    0.05    0.09    0.11    0.07    0.02    0.46
-95      0.24    0.07    0.11    0.12    0.08    0.03    0.02    0.02    0.67
-90      1.36    0.12    0.11    0.06    0.05    0.03    0.01    0.00    1.74
-80      5.67    0.41    0.36    0.34    0.31    0.24    0.11    0.05    7.49
-70     25.36    1.66    1.54    1.26    1.10    0.68    0.20    0.08   31.88
> -48   50.39    2.04    1.89    1.48    1.19    0.59    0.15    0.01   57.75
-------  ------  ------  ------  ------  ------  ------  ------  ------  ------
sum     83.08    4.33    4.04    3.31    2.82    1.68    0.57    0.18  100.00
```

(Upper limits for level bands are
−100/−95/−90/−80/−70 /−47dBm)

METHOD AND SYSTEM FOR LOAD SHARING BETWEEN A PLURALITY OF CELLS IN A RADIO NETWORK SYSTEM

FIELD OF THE INVENTION

The present invention relates to a method and a system for load sharing between a plurality of cells in a radio network system, wherein each of said cells is serving a number of mobile devices.

BACKGROUND OF THE INVENTION

Traffic management in mobile cellular networks comprises a set of features whose final purpose is the redistribution of the mobile devices in the cells so that the probability of congestion and blocking is reduced and, thus, capacity is increased and quality is improved.

In current systems, the design is based on the hypothesis of a uniform distribution of served mobile devices. However, such assumption may be far from reality. Namely, the flexibility resulting from the existing large set of parameters included in the different algorithms related to traffic distribution can not be fully seized because of its complexity. The large set of available parameters makes the detailed planning process on a cell-by-cell basis a time-consuming work.

As a consequence, operators fix parameters to a common set of default values shared between the cells even if the performance and capacity is not achieved in an optimum way. Moreover, a few operators extend the parameter optimisation by classifying the cells in accordance with certain scenarios like rural, urban, tunnel, indoors etc. and/or in accordance with the layer/band used (like Macro900/1800, Micro900/1800, Pico1800, Motorway900). So, the cells are divided into scenario groups or layer/band groups, and common default parameter values are shared which, however, are not optimum.

In those cases where existing features for traffic balance and congestion relief are difficult to optimise, just a few parameters are taken into account for optimisation which requires so-called field trials. During the tuning process, conclusions from parameter changes are difficult to derive, and final settings are nearly always on the safe side with its limited results. Moreover, such trials are normally focused on global parameters of features under study, and parameter optimisation of adjacent cells is hardly ever done. So, differences between adjacent cells are rarely considered due to a high effort required. Therefore, the potential of so-called adjacency parameters is not fully exploited.

A final limited parameter tuning based on cell/area level performance indicators is normally carried out only over those cells where performance problems are existing.

Even if an optimum value were reached by means of the above-mentioned trials, changes in traffic or environment conditions, like the installation of new cells, changes of interference level by frequency re-planning etc., would force a further re-tuning process of the parameter base, where no automatic reactive process is currently in use. Such a situation could be analysed as a result of slow trends, like the change of the number of user registrations, or fast changes, e.g. of the number of connections, during a short time period, like an hour or a day.

One of the critical causes of network variations is interference. Differences in propagation conditions between cells or changes in the frequency plan will produce variations in time or space. Adaptation to this variations would increase network performance, but would also require a very high tuning effort.

U.S. Pat. No. 5,241,685 A discloses a load sharing control for a mobile cellular radio system so as to achieve a load sharing between a first cell and a second cell adjacent to the first cell where each cell is serving a number of mobile devices. The first cell has a predetermined entering threshold which is a function of the received signal strength for mobile devices entering this cell from the second adjacent cell by means of handoff. A certain occupancy level indicates the occupied channels in relation to the available channels in the cell. For handover, the occupancy level of the first and second cells are determined, and it is further determined whether the second cell has a lower occupancy level than the first cell. Then, an entering threshold level for the second cell is determined which is a function of the received signal strengths for the mobile devises in the first cell about to enter the second cell. The entering threshold for the second cell is decreased if the occupancy level of the second cell is found to be lower than the occupancy level of the first cell, whereby the border between the first and second cells is dynamically changed. So, in this known system, the redistribution of the users for congestion relief is usually achieved by shrinking loaded cells through temporarily reduced margins for handovers between adjacent cells.

However, this prior art system has the disadvantages of reduced quality in traffic receiving cells and reduced overlapping in activation periods wherein the latter results in ping-pong problems.

SUMMARY OF THE INVENTION

It is an object of the present invention to improve the load sharing between a plurality of cells in a radio network system, in particular by taking congestion relief with quality constraints into account.

In order to overcome the above and further objects, according to a first aspect of the present invention, there is provided a method for load sharing between a plurality of cells in a radio network system, wherein each of said cells is serving a number of mobile devices, characterized in that, for handover of a mobile device from a currently serving source cell to a target cell, a prioritisation among cells adjacent to the source cell is carried out by calculating the associated power budgets between the currently serving source cell on the one hand and said adjacent cells on the other hand, and the adjacent cell having the highest priority is selected as target cell.

According to a second aspect of the present invention, there is provided a system for load sharing between a plurality of cells in a radio network system, wherein each of said cells is serving a number of mobile devices, characterized by means for calculating the power budgets between a source cell which is currently serving a mobile device to be handed over to a target cell on the one hand and cells adjacent said source cell on the other hand, means for priorisation among said adjacent cells in accordance with the result calculated by the calculating means, and means for selecting the adjacent cell having the highest priority as target cell.

So, in accordance with the present invention, once a handover is triggered, candidate cells are prioritised by calculation of their associated power budget margins.

An advantage of the present invention is that traffic and environment changes are tracked by means of automatic parameter auto-tuning in order to achieve the best performance without user interaction. As a consequence, less parameters are required to be adjusted. Further, the margins can be smoothly changed so that there is a smooth behaviour of the load sharing control. Moreover, the present invention provides for a better performance since quality and overlapping constraints are included together with capacity constraints so as to add more information in the control of the operational area of the cells concerned. In particular, better control of the operational area of the cells is achieved as adjacent parameters control the shape of the cell, and adaptation to cell differences can be easily carried out.

In particular, the final prioritising criterion is the received downlink power difference from a beacon channel.

In a preferred embodiment of the invention, the power budget PBGT (n) of the nth cell (n=1, 2, . . . , N; N>1) is calculated by using the equation $$PBGT(n) = RxLev_{adj} - RxLev_{serv} - HoMarginPBGT_{serv}(adj) \quad (1)$$

wherein $RxLev_{adj}$ is the receiving level of the adjacent cell, $RxLev_{serv}$ is the receiving level of the current serving source cell and $HoMarginPBGT_{serv}(adj)$ is a handover margin parameter.

In a preferred embodiment, the priorisation is carried out by taking into account both load and quality performance. So, displacement of overlapping area between adjacent cells may be controlled by both load and quality indicators, while overlapping may still be assured if the sum of margins is maintained unchanged. When using the above equation (1), the handover margin parameter $HoMarginPBGT_{serv}(adj)$ should be a function of both load and quality performance.

Usually, when the currently serving source cell is congested, its operational size is reduced.

The shrinking of the operational size of the cell concerned can be performed by means of relaxing handover conditions to the neighbouring cells. This action can be translated into a decrement of the HoMarginPBGT $serving \rightarrow adj$ parameters to adjacent cells. In the inverse direction of the 'adjacency', opposite action must be carried out for the $HoMarginPBGT_{adj \leftarrow serving}$ parameters of the adjacent cells, namely such parameters are incremented, so as to maintain constant overlapping areas between involved cells. Due to the fact that constant overlapping between involved cells may be desirable in order to avoid ping-pong effects, simultaneous adjustment of symmetric parameters should be carried out to modify by the same amount, of course to opposite direction. In this way, saturation in the adjacency only in one direction, caused by reaching operator constraints in parameter values, may easily be considered.

The present invention can be implemented in any kind of cellular mobile network systems like i.e. GSM or UMTS, or in internet protocol radio access networks. It should be also noted that the invention can be implemented in a multiradio environments where many different air interference protocols are used.

BRIEF DESCRIPTION OF THE DRAWINGS

In the following, the present invention will be described in greater detail based on a preferred embodiment with reference to the accompanying drawing Figures in which.

DESCRIPTION OF THE PREFERRED EMBODIMENTS

An automatic tuning process for handover margins used in a target-cell prioritisation algorithm is here described.

In radio access networks, candidate cells are prioritised through calculation of their association power budget. Discarding minor compensation terms, the evaluation of this indicator uses the equation $$PBGT(n) = RxLev_{adj} - RxLev_{serv} - HoMarginPBGT_{serv}(adj) \quad (1)$$

wherein $RxLev_{adj}$ is the receiving power level of the nth adjacent cell, $RxLev_{serv}$ is the receiving power level of the currently serving source cell, and $HoMarginPBGT_{serv}(adj)$ is a handover margin parameter.

The remaining adjacent handover margin parameter $HoMarginPBGT_{serv}(adj)$ is normally used to assure hysteresis (i.e. overlapping) region to avoid instabilities from ping-pong problems. In best cases, some operators bias the priority evaluation to cells belonging to capacity layers (i.e. micro and pico cells). In some situations, scenario considerations (e.g. average interference in tight frequency reuse, propagation severity differences in indoor-outdoor environments/900–1800 MHz bands) may also be included by experienced operators, but no differences between cells in the same class or time periods are accounted for.

A control method for this handover margin parameter is provided in order to achieve prioritisation of adjacent cells taking into account differences in the signal level requirements. Thus, displacement of overlapping area between adjacent cells is controlled by both load and quality indicators, while overlapping may still be assured if the sum of margins is maintained unaltered. Doing so, the space of the cell is controlled.

A key factor resides on the ability to define a mapping function between received downlink level from BCCH channel (broadcast control channel) and predicted quality of assigned channel. This function will make use of mobile measurement reports extracted dynamically from the network, easily differentiating among cells or time. In this way, the automation algorithm will cope with scenario differences (i.e. interference, propagation severity) due to traffic trend changes both in space and time.

Figure 1:
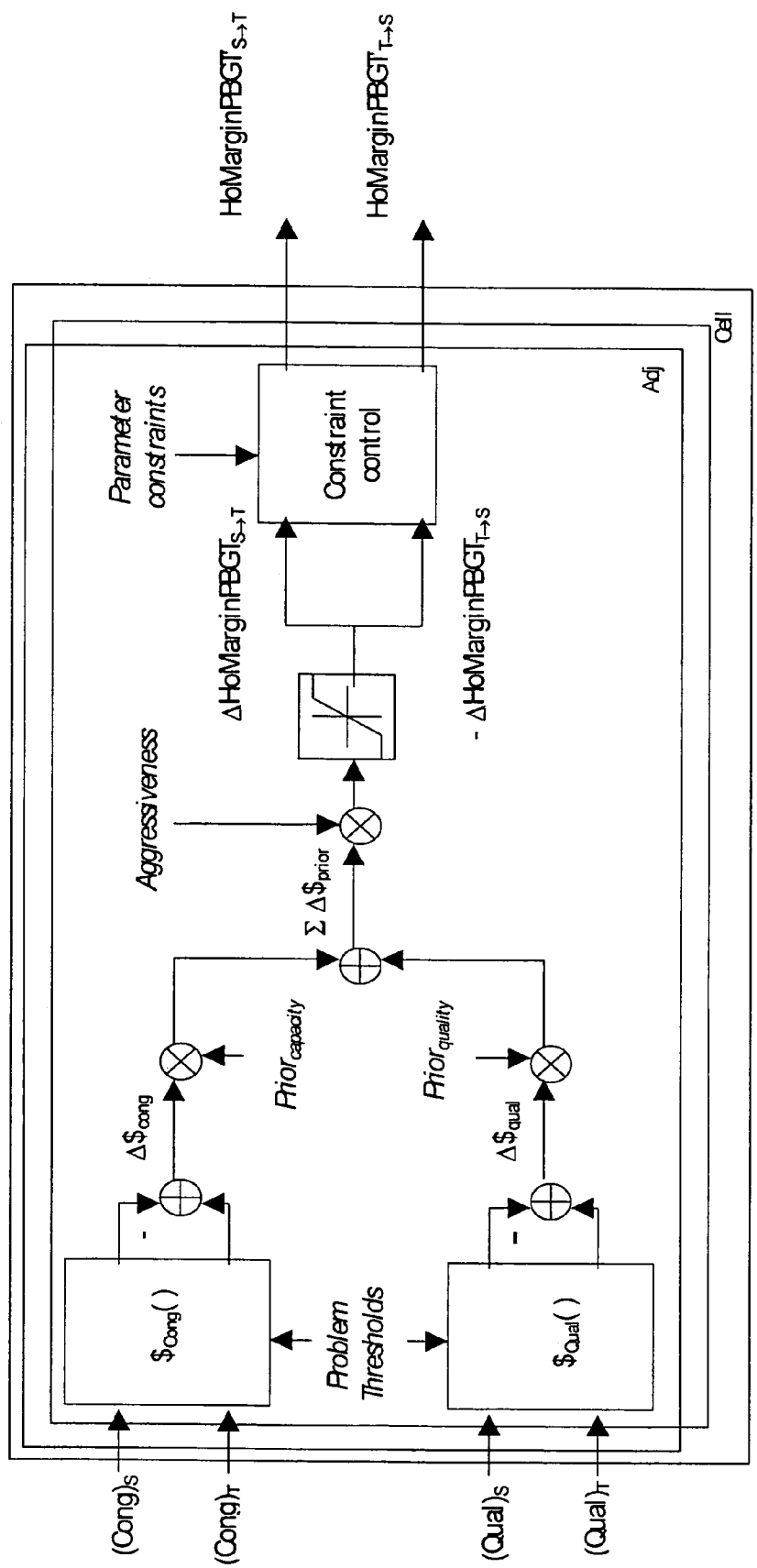
FIG. 1 is a schematical diagram showing a process for the final parameter setting. The proposed final values (i.e.: output) for the adjacency automated margins are derived from congestion and quality indicators of serving and adjacency target cells. From differences of both indicators, a conclusion for changes in involved parameters is drawn.

FIG. 1 schematically shows a tuning process for providing minimum level thresholds from measurement reports wherein in particular shown is the flow of information from the network to the final parameter setting. Collection of mobile measurements from users in connected mode is undertaken in every cell. By means of further processing of these raw counters, the probability density function PDF=$f_{cell}$(Received Level, Perceived Channel Quality) construction is straightforward.

Figures 2, 3:
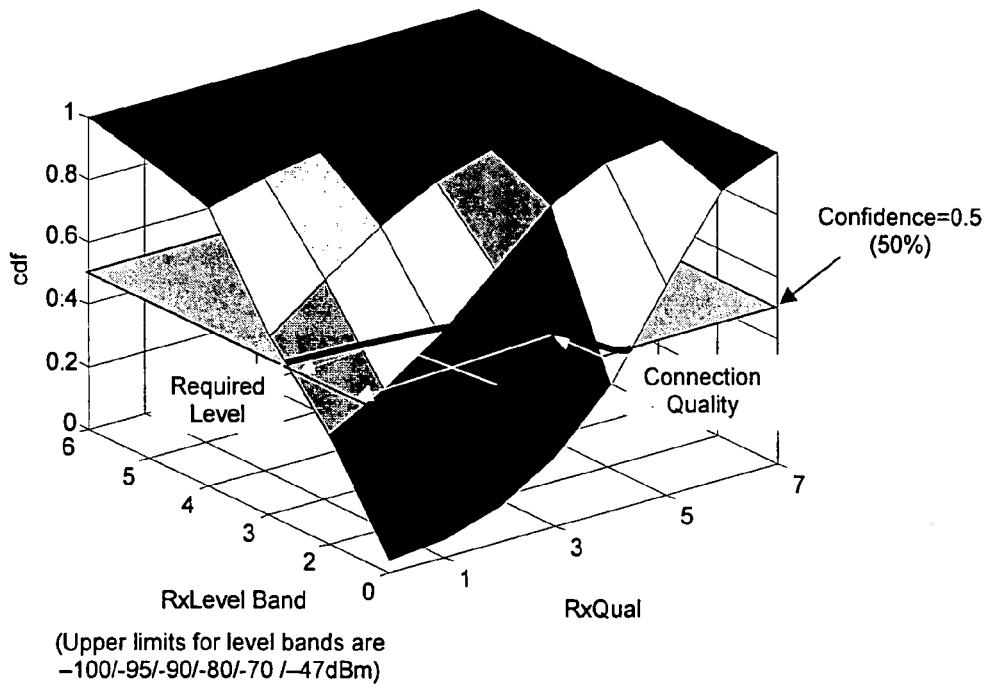
FIG. 2 shows an example of a table showing percentage of samples in predefined defined downlink quality (columns) and received level intervals (rows)
FIG. 3 shows a three-dimensional plot indicating a cumulative density function extracted based on samples from the previous table, and a graphical representation of how a conclusion for the minimum required level is drawn from the quality requirements.

A tabular representation is depicted in FIG. 2 showing an example of a table structure of RxLev/RxQual counters from Rx-level statistics (TRX level, downlink), wherein RxLev is the receiving level and RxQual is the receiving quality and the Rx-Level is the receiving level.

From this piece of information, the probability of perceiving at least a certain connection quality may be extracted for every measured received level. This three-dimensional function is depicted in FIG. 3 showing a three-dimensional plot of cumulative RxQual distribution from Rx-Level statistics on the basis of samples extracted from real data. So, this figure shows the appearance of cumulative quality distribution (i.e. probability of getting quality better than a certain value), for every level band. In the example, upper limits for 1,2,3,4,5,6 level bands are −100, −95, −90, −80, −70 and 47 dBm, respectively. It is worthwhile to note that they were extracted from a real network management system database. The intersection between Confidence and RxLevel-RxQual three-dimensional planes is the aimed relationship Quality-to-Level.

Once this Level-to-Quality relationship has been constructed, the next steps will aim at building the inverse Quality-to-Level function.

Figure 4:
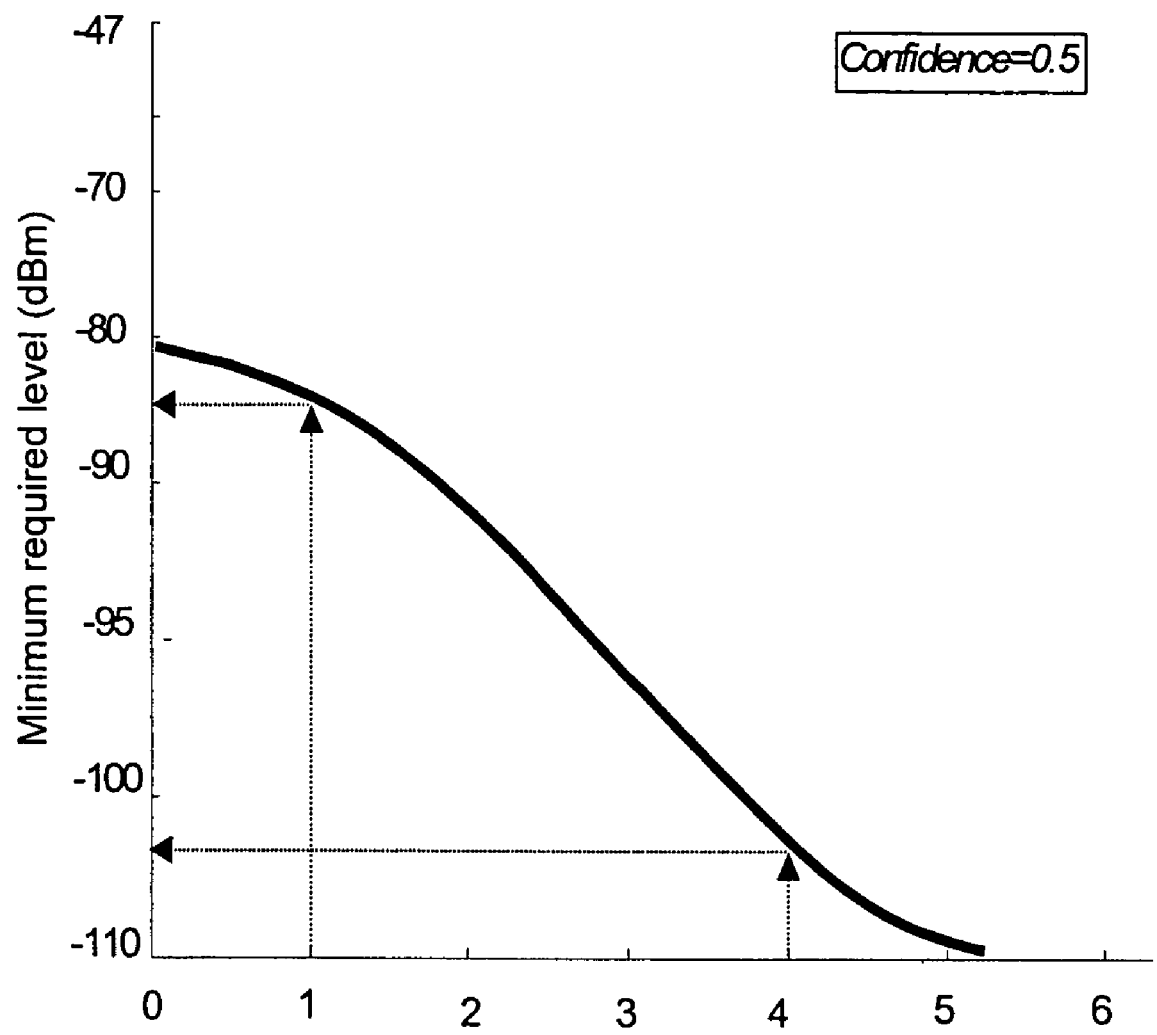
FIG. 4 shows a graph indicating the curve which represents the intersection between surfaces in the previous figure, where it is clearly seen the relationship between required quality and minimum required level.

First, the confidence of the mapping process must be decided. The meaning of this internal parameter of the algorithm relates to the likelihood of the decision that a certain level is enough to get a predefined quality. Its graph is a plane whose intersection with the three-dimensional probability function defines a unique curve relating target connection quality to minimum required level (i.e.: Quality-to-Level relationship), represented in FIG. 4.

Figure 5:
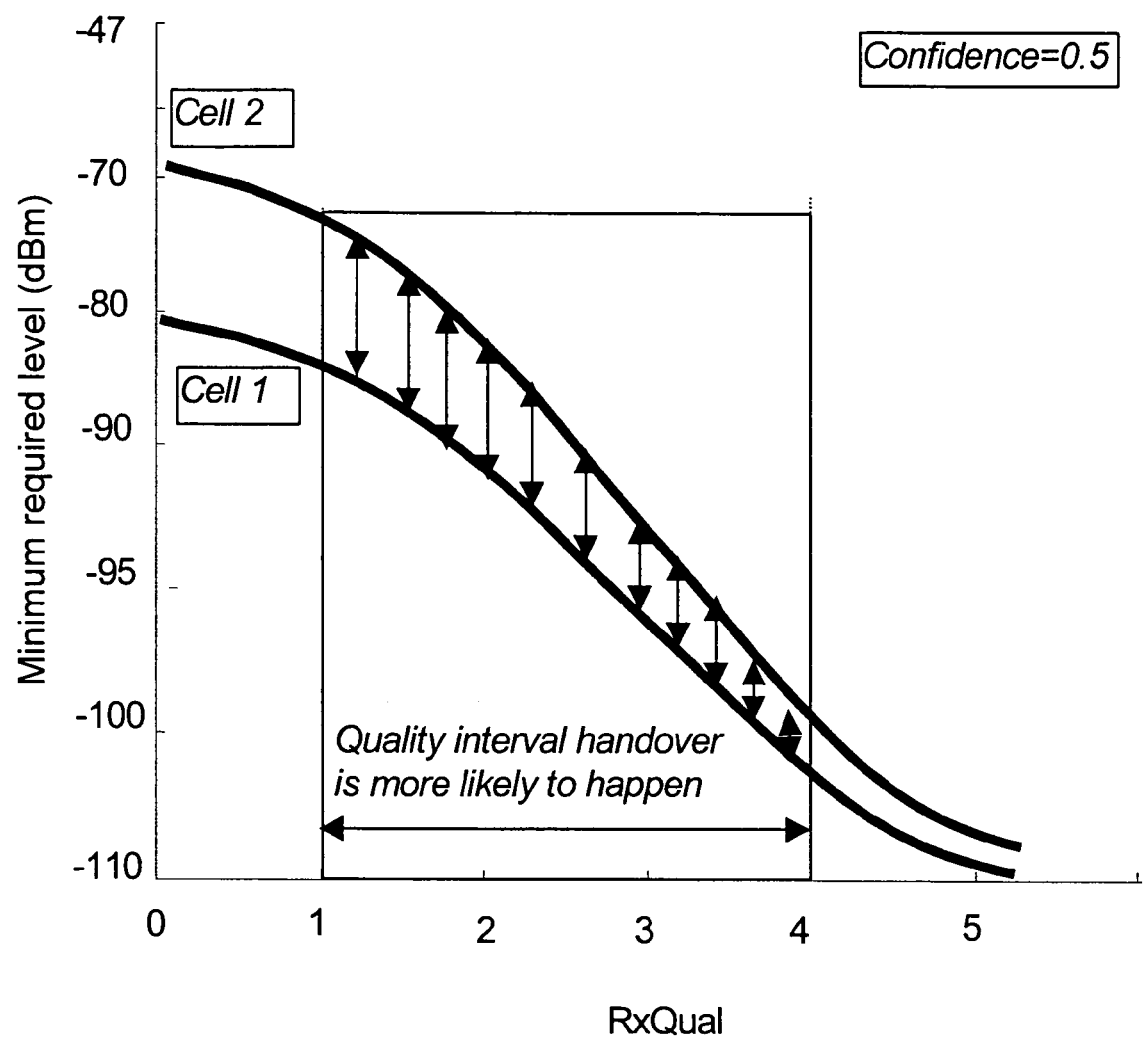
FIG. 5. shows a graph indicating the differences between adjacent cells in terms of, required level for ascertain quality (i.e.: Quality-to-Minimum Level mapping). Averaging over quality values more likely to happen is carried out to calculate a final unique global indicator of the difference.

From this relationship, the comparison between cells is rather straight-forward, which is shown in FIG. 5. Those cells that require a higher level to fulfill quality targets have their priority reduced in favour of those less power greedy. The adjacency handover margin should correspond to level differences between adjacent cells (equally distributed through both margins in the adjacency, still maintaining a constant residual term for overlapping).

The only remaining issue is the quality target which is used for level comparison purposes, as the quality cross point for handover is not known. Averaging of level values through quality values where handover may occur (i.e.: from Q0 to Quality Handover Threshold) must be done to get a unique value which reflects the difference in level requirements in the adjacency.

Figure 6:
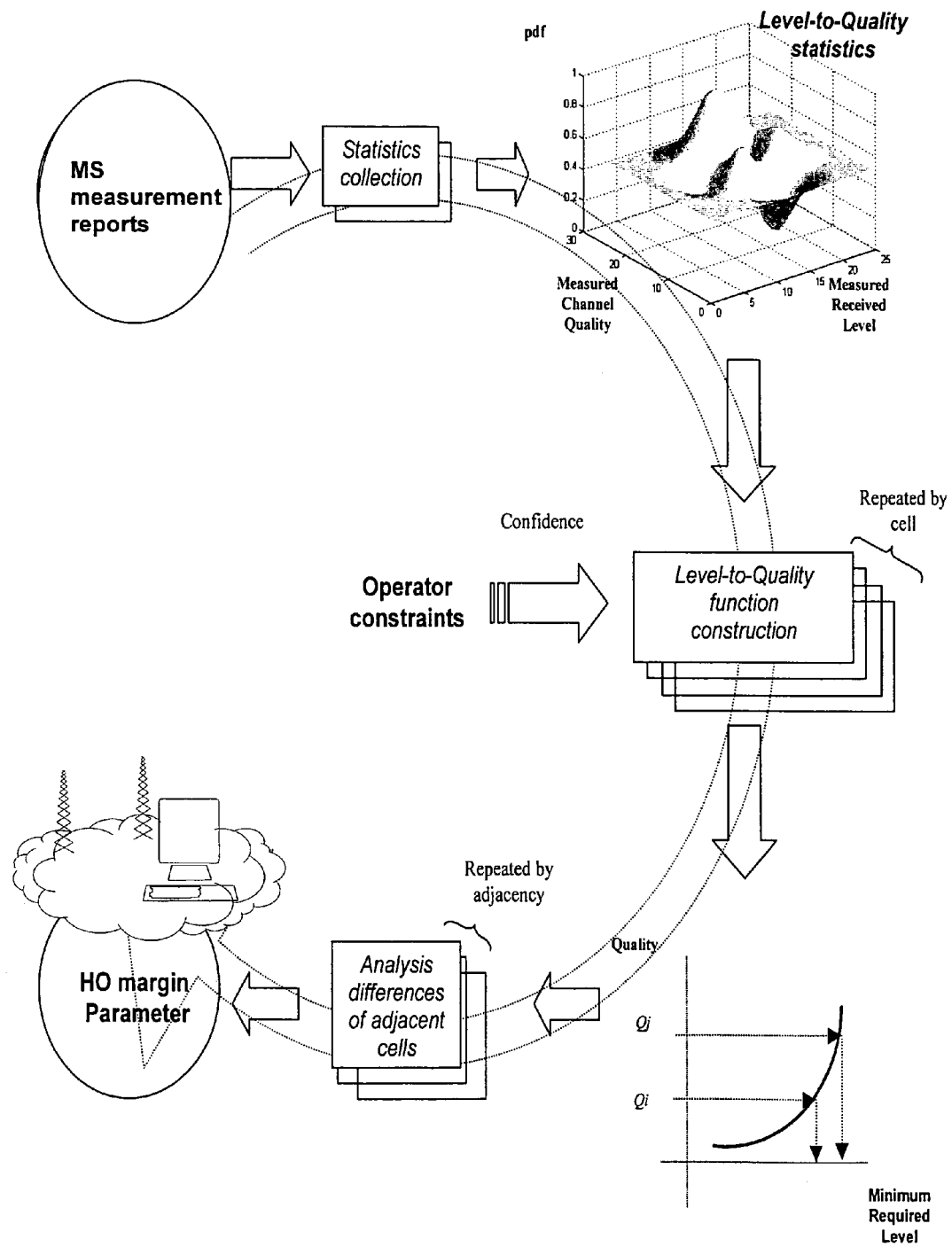
FIG. 6 shows a block diagram of a preferred embodiment of a control structure for power budget margin automation in accordance with a preferred embodiment of the present invention.

In FIG. 6, the basic structure of the proposed control module applied in adjacency basis for the parameter margin parameter HoMarginPBGT$_{serving \to adj}$ and HoMarginPBGT$_{adj \to serving}$ is presented.

In a first step, formulas are applied to raw counters in order to extract meaningful quality and congestion performance indicators from source (S) and target (T) cells. Either directly defining a cost function, or just defining thresholds for acceptable and non-acceptable situations (and building it in intervals with different slopes), operator controls the mapping function from raw counters to quality and capacity problem indicators. A different mapping cost function is used to extract the problem indicators related to quality and congestion, while they can be possibly shared between cells.

The selected controller follows an incremental structure, proposing the increment/decrement from the previous values. Basically, when a cell is congested, shrinking its operational size by means of relaxing handover conditions to neighbouring cells can be performed for traffic balancing between cells. This action is translated into a decrement in HoMarginPBGT$_{serving \to adj}$ parameters to adjacent cells. In the inverse direction of the adjacency, opposite action must be carried out for HoMarginPBGT$_{adj \to serving}$ parameters to maintain constant overlapping between cells.

Due to the fact that constant overlapping between involved cells may be desirable in order to avoid ping-pong effects, simultaneous adjustment of symmetric parameters must be carried out to modify by the same amount (of course in opposite directions). In this way, saturation in the adjacency only in one direction, caused by reaching operator constraints in parameter values, may easily be considered.

Being balance in problems (i.e. costs) between cells the last purpose of the automation action, the cost difference output controls the direction and magnitude of changes. This error signal related to problem indicator differences is to be minimised, as in most control systems. The equilibrium point will be reached when this cost error between cells is zero (not necessarily individual costs). As it may be seen from a closer analysis, this structure has a variable step size, proportional to deviation from stability final point.

In situations where trade-off is achieved (i.e.: serving cell is congested and adjacent cell has bad quality), cost terms of opposite sign compensate, whenever cost values for threshold crossing are consistent (i.e.: equal problem indicator for border problem). A final equilibrium point (i.e. cost difference equal to 0.0) can be biased by weighting problem indicator difference terms with two priority factors, taking into account operator preferences in term of quality or capacity priorities.

Calculated deviation from balance is adjusted by means of step control, selecting the aggressiveness of the tuning process, and thus influencing on the final trade-off between speed/stability of the convergence process to the final equilibrium solution. A subsystem in a higher level in the proposed hierarchical control architecture may govern the speed, based on instability detection (i.e.: oscillation in parameter values) or slow convergence.

Once deviation from current values is proposed, final checks must be done against maximum and minimum limits constrained by the operator.

Although the invention is described above with reference to an example shown in the attached drawings, it is apparent that the invention is not restricted to it, but can vary in many ways within the scope disclosed in the attached claims.

The invention claimed is:

1. A method for load sharing between a plurality of cells in a radio network system, wherein each of said cells is serving a number of mobile devices, comprising the steps of, for handover of a mobile device from a currently serving source cell to a target cell, carrying out a prioritization among cells adjacent to the source cell by calculating the power budgets between the currently serving source cell on the one hand and said adjacent cells on the other hand, and selecting the adjacent cell having the highest priority as target cell, wherein a handover margin parameter used in said power budget calculation is a function of both load and quality performance, and, when the currently serving source cell is congested, its operational size is reduced while keeping the overlapping area between the involved cells substantially constant.

2. The method according to claim 1, wherein the final prioritizing criterion is a received downlink power difference from a beacon channel.

3. The method according to claim 1, wherein the power budget PBGT(n) of the nth cell (n=1, 2, 3 . . . , N; N>1) is calculated by using the equation $$PBGT(n)=RxLev_{adj}-RxLev_{serv}-HoMarginPBGT_{serv}(adj),$$

wherein $RxLev_{adj}$ is the receiving level of the nth adjacent cell, $RxLev_{serv}$ is the receiving level of the currently serving source cell, $HoMarginPBGT_{serv}(adj)$ is said handover margin parameter.

4. The method according to claim 3, wherein $HoMarginPBGT_{serv}(adj)$ is a function of a predetermined scenario.

5. The method according to claim 3, wherein $HoMarginPBGT_{serv}(adj)$ is a function of a predetermined hystereses.

6. The method according to claim 3, wherein a handover margin parameter $HoMarginPBGT_{serving \rightarrow adj}$ of the currently serving source cell with respect to an adjacent cell is decremented.

7. The method according to claim 6, wherein a handover margin parameter $HoMarginPBGT_{adj \rightarrow serving}$ of an adjacent cell with respect to the currently serving source cell is incremented.

8. A system for load sharing between a plurality of cells in a radio network, said system comprising:

means for calculating the power budgets between a source cell which is currently serving a mobile device to be handed over to a target cell on the one hand and cells adjacent to said currently serving source cell on the other hand, said calculating means is adapted to use a handover margin parameter in said power budget calculation, said handover margin parameter being a function of both load and quality performance, means for prioritization among said adjacent cells in accordance with the result calculated by the calculating means, means for selecting the adjacent cell having the highest priority as target cell, and means for reducing the operational size of the currently serving source cell in case of congestion, while keeping the overlapping area between the involved cells substantially constant.

9. The system according to claim 8, wherein said priorization means uses a receiving downlink power difference from a beacon channel as a final prioritizing criterion.

10. The system according to claim 8, wherein the calculating means calculates the power budget PBGT(n) of the nth cell (n=1, 2, 3, . . . , N; N>1) by using the equation $$PBGT(n)=RxLev_{adj}-RxLev_{serv}-HoMarginPGBT_{serv}(adj),$$

wherein $RxLev_{adj}$ is the receiving level of the nth adjacent cell, $RxLev_{serv}$ is the receiving level of currently serving source cell, and $HoMarginPGBT_{serv}(adj)$ is said margin parameter.

11. The system according to claim 10, wherein $HoMarginPGBT_{serv}(adj)$ is a function of a predetermined scenario.

12. The system according to claim 10, wherein $HoMarginPGBT_{serv}(adj)$ is a function of a predetermined hystereses.

13. The system according to claim 10, further comprising means for decrementing a handover margin parameter $HoMarginPGBT_{serving \rightarrow adj}$ of the currently serving source cell with respect to an adjacent cell.

14. The system according to claim 13, further comprising means for incrementing a handover margin parameter $HoMarginPGBT_{adj \rightarrow serving}$ of an adjacent cell with respect to the currently serving source cell.

* * * * *